April 29, 1952   R. L. MAYHEW   2,594,330
GAS GENERATOR
Filed May 6, 1947

INVENTOR.
ROBERT L. MAYHEW
BY
ATTORNEYS

Patented Apr. 29, 1952

2,594,330

UNITED STATES PATENT OFFICE 2,594,330

GAS GENERATOR

Robert L. Mayhew, Great Neck, N. Y., assignor to Hydrocarbon Research, Inc., New York, N. Y., a corporation of New Jersey Application May 6, 1947, Serial No. 746,346

2 Claims. (Cl. 48—196)

This invention relates to a gas generator and more particularly to a generator for preparing synthesis gas for synthesis of hydrocarbons, oxygenated compounds and the like.

In the preparation of so-called synthesis gas for synthesis of hydrocarbons, oxygenated compounds and the like, usually consisting essentially of approximately one part carbon monoxide to two parts hydrogen, the gas is preferably prepared by the controlled combustion of a carbonaceous material such as coal, oil or natural gas with substantially pure oxygen, steam being added in some cases, dependent upon the carbonaceous material employed, to obtain the final desired composition. The temperature of the reaction is usually in the order of 2000-2500° F., the gases being discharged at about that temperature. It is desirable to cool the gases to a temperature in the order of 600-650° F. to forestall secondary reactions and to cool the gases to a temperature more suitable for charging to the synthesis reactor or storage facilities.

It is an object of this invention to provide novel means for the prompt cooling of such gases immediately after their generation, substantially all the abstracted heat being conserved for use in other phases of the process.

Another object of the invention is the provision of a novel combined gas generating and cooling means wherein the generator proper and the cooling means are combined in a manner to insure highly efficient heat exchange coupled with adequate protection of the metal elements from the relatively high temperatures encountered.

Another object of the invention is the provision of a novel combined gas generating and steam generating means combined in a relatively simple and compact structure, the various elements being capable of ready repair.

Other objects and advantages of the invention will appear from the following description and claims taken in connection with the attached drawing wherein:

In brief, the present invention may be described as a combined gas generator, gas cooler and steam generator. A gas generator and a gas cooler are arranged so that the hot generated gases from the generator are discharged into the gas cooler and caused to pass in indirect heat exchange with a cooling medium, the latter preferably being in the form of a substantially complete steam generating assembly, the cooled gases being immediately discharged or recirculated about the exterior of the gas cooler and gas generator. The steam generator is arranged so that the tubes thereof form a substantially uniform and symmetrical pattern extending over the path of flow of the gases being cooled, suitable baffles being positioned therein in staggered relation.

Figure 1:
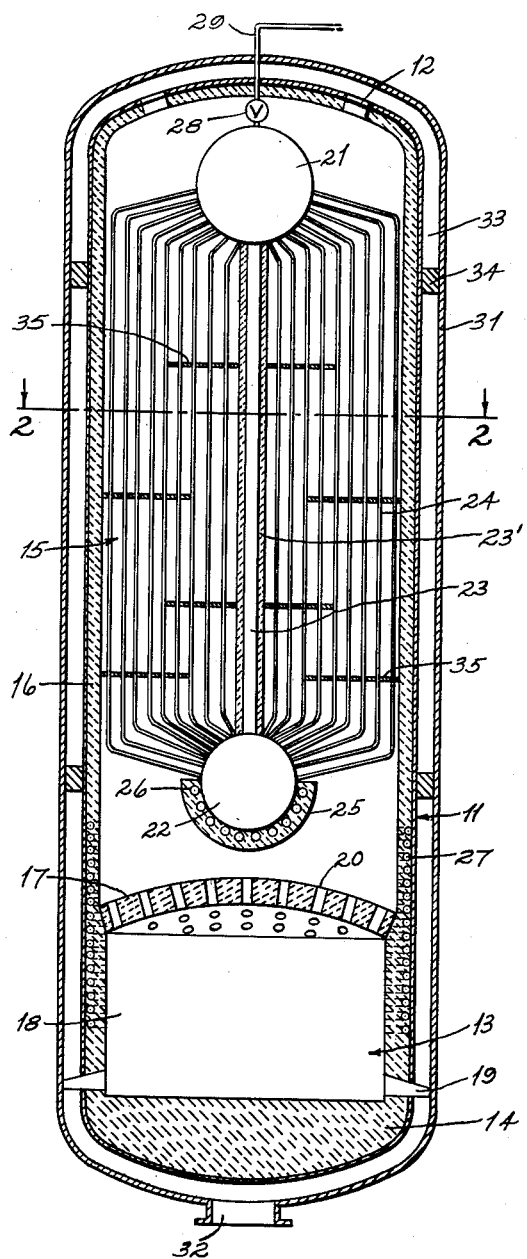
Fig. 1 is a longitudinal section taken through the vertical axis of a preferred embodiment of the invention, a number of the tubes in the cooling section being omitted for the sake of clarity.

Referring to Fig. 1, a shell 11 of a suitable heat resistant metal and generally cylindrical in shape is provided with end ports 12 in one end thereof for the discharge of gas. Shell 11 has a gas generator 13, lined with a relatively thick layer 14 of suitable refractory at its lower end, and a gas cooler 15, lined with a thinner layer 16 of refractory, and extending from the gas generator to the other end of the shell. Gas generator 13 may be closed by a refractory cap 17 to define a combustion chamber 18 into which the reactants are charged through burner ports 19, the latter being provided in any suitable number and preferably distributed uniformly as close to the bottom of the chamber as is practicable to provide as nearly as possible the same space-time-temperature relation for all portions of the charge. Cap 17 is provided with apertures 20 for the discharge of the product gases. If desired, cap 17 may be omitted or only sufficient refractory used to confine enough heat of the reaction to the combustion space to maintain the desired temperature of 2000-2500° F. and shield the adjacent portion of the cooling assembly from direct radiation from the combustion chamber. If a cap 17 or any type of partially covering refractory be used, it is desirable that the apertures formed therein be disposed so that the gases discharged from the combustion space are substantially uniformly distributed over the transverse cross-section of the gas cooler.

Figure 2:
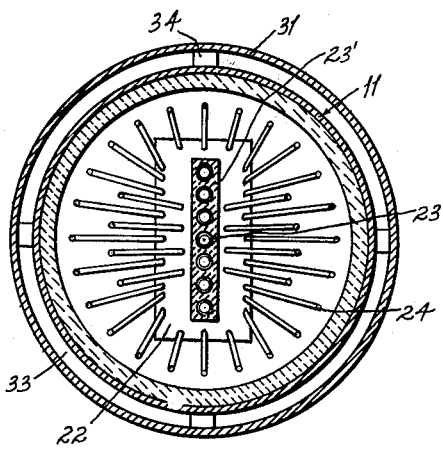
Fig. 2 is a section taken on the line 2—2 of Fig. 1, the baffles of Fig. 1 being omitted.

The steam generating assembly is mounted in gas cooler 15, the assembly including a steam drum 21, a mud drum 22, downcomers 23, and water tubes 24. The water tubes, extending from drum to drum, are formed in a generally bowed shape, i. e., the portions immediately adjacent the drums are arranged to extend from the drums in planes approaching a transverse plane through the gas cooler so that the intermediate portions of the tubes are positioned outside the transverse projections of the drums. This shaping of the tubes has the advantage in that by making the generally transverse portions near the drums of different lengths, the intermediate portions of the tubes can be positioned in various parts of the gas cooler, thereby enabling a substantially uniform pattern of the tubes as shown in Fig. 2. The bowed shaping of the water tubes has the further advantage in that the tubes are substantially free to expand and contract under different temperature conditions in the gas cooler and any tendency for their connections to the drums to loosen is materially reduced. This problem is not encountered with the downcomers since they are filled with water and insulated as shown at 23' to remain at a substantially uniform temperature. Since the downcomers are always at the approximate steam temperature and of approximately the equivalent length of the water tubes, the vertical lengths of the water tubes being considered to be the equivalent lengths, the expansion and contraction problem as regards the downcomers is substantially eliminated, there being no need for such devices as conventional expansion loops.

The bottom of mud drum 22 is preferably shielded as by refractory 25, the latter also serving the purpose of baffling the gases from combustion chamber 13 outwardly toward the wall of the gas cooler and insuring their contact with water tubes 24. Water tubes 26 may be provided in refractory 25 as shown and like tubes 27 in refractory layers 14 and 16 for further protection of the metal elements, the tubes being used to preheat the water fed to the steam generating assembly.

It is to be understood that suitable connections (not shown) for the take-off of steam from drum 21 and the feed of fresh water to the steam generating assembly are provided in conventional manner. A pressure relief valve 28 is connected to steam drum 21, the outlet 29 therefrom leading outside the generator.

The entire steam generating unit is preferably supported by suitable supports (not shown) extending from the shell walls to the steam drum, preferably at about the same elevation as the water feed line (not shown).

A shell 31, which may be of plain carbon steel, is provided to extend entirely around shell 11, shell 31 being closed except for a port 32 adjacent the gas generator, and of greater diameter than shell 11 so that an annular open space 33 is defined therebetween, suitable spacing lugs 34 being provided in the space between the two opposing surfaces.

Baffles 35 are mounted on the tubes of the steam unit in a staggered manner as shown so that the gases passing through the gas cooler are obliged to follow tortuous paths around and over the tube surfaces, giving better boiler efficiency.

In operation, the carbonaceous material and the oxygen, with or without steam as desired, are charged into combustion chamber 18 through burner ports 19, the gases reacting therein at a temperature in the range of 2000-2500° F. or even higher and a pressure of approximately 250 pounds per square inch gauge. The hot gases are discharged from the combustion chamber through ports 20 into the gas cooler where they contact water tubes 24, the pattern of the latter being such that the gases are uniformly cooled, the heat thereof being absorbed by the fluid medium in the tubes. The cooled gases may be discharged directly from the gas cooler through ports 12 to use or storage facilities or when shell 31 is used, they will be returned about shell 11 through annular space 33 for eventual discharge through port 32. Since the gases at ports 12 are at a temperature of about 600° F., they have a considerable cooling effect in their reverse travel through space 33. It will be noted that the cool gases also pass around burner ports 19, thereby cooling the burners and extending their lives. In connection with the reverse travel of the cooled gases, the upper end of shell 11 with its ports 12 may be omitted entirely so that the cooled gases are discharged through the open end into annular space 33.

Under the conditions described, the heat of the gases is effectively conserved, the steam generated having a pressure in the order of 675 pounds per square inch gauge and being available for use in other phases of the process.

If desired, annular space 33, between the inner and outer shells of the assembly, can be formed as a water jacket and water circulated therethrough to effect cooling, the cooled gases then being discharged through ports 12 and an adjacent port in the outer shell.

It will be noted that the generator is of relatively simple construction, the several parts thereof being capable of ready repair. By reason of the positioning of the drums and the tubes therebetween entirely within the gas cooler, the problems incident to different degrees of expansion and contraction incident to the temperatures encountered are substantially reduced. The generated gases are cooled quickly and efficiently, and the heat therefrom rendered immediately available for other uses.

Obviously many modifications and variations of the invention as above set forth may be made without departing from the spirit and scope thereof and only such limitations should be imposed as are indicated in the appended claims.

I claim:

1. A gas generator for the production of carbon monoxide by the interaction of a carbonaceous fuel with oxygen at an elevated pressure comprising a relatively elongate and substantially vertical cylindrical inner shell having a refractory lining, a refractory partition extending across said shell dividing it into a reaction chamber and an elongate cooling chamber, said reaction chamber being in the lower extremity of said inner shell, reactant inlets in said reaction chamber, a passageway in said partition permitting the product gases to pass from the reaction chamber to the cooling chamber, gas outlet means from said cooling chamber adjacent the upper extremity of said inner shell, a pressure resistant outer shell concentric with said inner shell and spaced around the outer wall of the inner shell to define an annular passage space therebetween, an outlet in said outer shell from said annular passage space located adjacent the lower extremity of said outer shell, said gas outlet means from said cooling chamber in the upper extremity of said inner shell communicating with the upper portion of said annular passage space, means for cooling the gases in the cooling chamber comprising a steam drum supported in the upper portion of said cooling chamber, a mud drum adjacent the lower end of said cooling chamber, a plurality of steam generating tubes extending longitudinally of said cooling chamber between said steam and mud drums to form a pattern extending over the transverse area of said cooling chamber, a plurality of downcomer tubes between said drums, and refractory means surrounding said downcomer tubes effective to substantially limit heat transfer between said downcomer tubes and the product gases in said cooling chamber.

2. A gas generator for the production of carbon monoxide by the interaction of a carbonaceous fuel with oxygen at an elevated pressure comprising a relatively elongate and substantially vertical cylindrical inner shell having a refractory lining, a refractory partition extending across said shell dividing it into a reaction chamber and an elongate cooling chamber, said reaction chamber being in the lower extremity of said inner shell, reactant inlets in said reaction chamber, a passage in said partition permitting the product gases to pass from the reaction chamber to the cooling chamber, gas outlet means from said cooling chamber adjacent the upper extremity of said inner shell, a pressure resistant outer shell concentric with said inner shell and spaced around the outer wall of the inner shell to define an annular passage space therebetween, an outlet in said outer shell from said annular passage space located adjacent the lower extremity of said outer shell, said gas outlet means from said cooling chamber in the upper extremity of said inner shell communicating with the upper portion of said annular passage space, means for cooling the gases in the cooling chamber comprising a steam drum supported in the upper portion of said cooling chamber, a mud drum adjacent the lower end of said cooling chamber, and a plurality of tubes extending longitudinally of said elongate cooling chamber between said steam and mud drums to form a pattern extending over the transverse area of said cooling chamber.

ROBERT L. MAYHEW.

REFERENCES CITED

The following references are of record in the file of this patent:

UNITED STATES PATENTS

| Number | Name | Date |
|---|---|---|
| 333,691 | Stewart | Jan. 5, 1886 |
| 443,122 | Stevens | Dec. 23, 1890 |
| 447,916 | Stewart | Mar. 10, 1891 |
| 1,049,748 | Marischka | Jan. 7, 1913 |
| 1,757,232 | Becker | May 6, 1930 |
| 1,794,802 | Spyer | Mar. 3, 1931 |
| 1,827,244 | La Mont | Oct. 13, 1931 |
| 1,874,527 | Herpen | Aug. 30, 1932 |
| 1,967,582 | Marischka | July 24, 1934 |
| 2,007,540 | La Mont | July 9, 1935 |
| 2,119,817 | Keller | June 7, 1938 |
| 2,239,895 | Kuhner | Apr. 29, 1941 |

FOREIGN PATENTS

| Number | Country | Date |
|---|---|---|
| 252,463 | Great Britain | May 28, 1926 |

OTHER REFERENCES

Ser. No. 303,852, Szigeth (A. P. C.), published April 27, 1943.